(12) United States Patent
Kamble et al.

(10) Patent No.: US 11,421,784 B2
(45) Date of Patent: Aug. 23, 2022

(54) MULTI-POSITION CRANKSHAFT LIP SEAL

(71) Applicant: Powerhouse Engine Solutions Switzerland IP Holding GmbH, Zug (CH)

(72) Inventors: Sandeep Namadev Kamble, Bangalore (IN); Michael Mendoza, Fredonia, PA (US); Kamala Hasan Pethuraj, Bangalore (IN); John Stephen Roth, Millcreek Township, PA (US)

(73) Assignee: Powerhouse Engine Solutions Switzerland IP Holding GmbH, Zug (CH)

( * ) Notice: Subject to any disclaimer, the term of this patent is extended or adjusted under 35 U.S.C. 154(b) by 124 days.

(21) Appl. No.: 17/077,814

(22) Filed: Oct. 22, 2020

(65) Prior Publication Data

US 2022/0018440 A1 Jan. 20, 2022

Related U.S. Application Data

(60) Provisional application No. 63/052,824, filed on Jul. 16, 2020.

(51) Int. Cl.

| *F16J 15/32* | (2016.01) |
| *F16J 15/322* | (2016.01) |
| *F01M 11/02* | (2006.01) |
| *F02F 11/00* | (2006.01) |
| *F16J 15/16* | (2006.01) |
| *F16J 15/324* | (2016.01) |
| *F16F 15/315* | (2006.01) |

(52) U.S. Cl.
CPC ............ *F16J 15/322* (2013.01); *F01M 11/02* (2013.01); *F02F 11/00* (2013.01); *F16J 15/164* (2013.01); *F16J 15/324* (2013.01); *F16F 15/315* (2013.01)

(58) Field of Classification Search
CPC ...... F16J 15/322; F16J 15/324; F16J 15/3252; F16J 15/164; F01M 11/02; F02F 11/00; F16F 15/315
See application file for complete search history.

(56) References Cited

U.S. PATENT DOCUMENTS

| 3,575,426 | A | * | 4/1971 | Durham | .................... F16J 15/40 |
| | | | | | 277/432 |
| 5,009,737 | A | | 4/1991 | Lescaut | |
| 6,428,015 | B1 | * | 8/2002 | Iwakata | ............... F16J 15/3244 |
| | | | | | 277/559 |
| 2004/0113369 | A1 | * | 6/2004 | Wright | ................... F16J 15/324 |
| | | | | | 277/549 |

FOREIGN PATENT DOCUMENTS

JP          WO2014132674      *  9/2014   ............. F16J 15/324

* cited by examiner

*Primary Examiner* — Syed O Hasan
(74) *Attorney, Agent, or Firm* — McCoy Russell LLP

(57) ABSTRACT

Various systems and methods are provided for utilizing a crankshaft lip seal over the course of a first overhaul life and a second overhaul life. In one example, a method includes installing the crankshaft lip seal between a flywheel housing and a crankshaft of an engine and operating the engine with the crankshaft lip seal. The method further includes removing the crankshaft lip seal, re-machining a floating seal sleeve coupled to the crankshaft or the flywheel housing, and replacing a lip. The crankshaft lip seal is then re-installed between the flywheel housing and the crankshaft and the engine operated with the re-installed crankshaft lip seal.

16 Claims, 10 Drawing Sheets

MULTI-POSITION CRANKSHAFT LIP SEAL

CROSS REFERENCE TO RELATED APPLICATION

The present application claims priority to U.S. Provisional Patent Application No. 63/052,824, entitled "MULTI-POSITION CRANKSHAFT LIP SEAL", and filed on Jul. 16, 2020. The entire contents of the above-listed application is hereby incorporated by reference for all purposes.

BACKGROUND

Technical Field

Embodiments of the subject matter disclosed herein relate to a multi-position crankshaft lip seal.

Discussion Of Art

An engine, such an automotive or locomotive engine, can have a crankcase, pistons, and a crankshaft. The pistons cause the crankshaft to rotate about an axis thereby converting linear motion into rotational motion. In a combustion engine, a flywheel is coupled to the crankshaft, the flywheel and crankshaft being in splined engagement. The function of a crankshaft lip seal is to seal the radial gap between the rotating crankshaft and stationary flywheel housing thereby maintaining oil and vacuum pressure inside the crankcase. If sealing is not done properly it can lead to oil and/or air leakages, thereby causing crankcase pressure to increase above a threshold limit resulting in engine shutdown. However, the positioning of the seal between the fixed flywheel housing and the rotating crankshaft may lead to component degradation, with wear occurring between the crankshaft and the seal. The wear on the crankshaft from the seal may form a clearance path from the machining action. This condition may lead to the intrusion of dirt and other unwanted debris into engine cavities. The harsh environment that the seal is in may add to seal degradation. Having seals exposed to hot engine oil may degrade the seal and reduce reliability. Thus, a seal eventually wears out and must be replaced. However, such seals may be difficult to remove, and the crankshaft surface that is in contact with the seal may need to be re-machined. Re-machining the surface of the crankshaft may alter the dimensions of the surface which, in turn, may require a new seal with new and suitable dimensions (e.g., the new seal is a different size than the seal being replaced).

It may be desirable to have a system and method that differs from those that are currently available.

BRIEF DESCRIPTION

In one embodiment, a method includes installing a multi-position crankshaft floating lip seal assembly between a flywheel housing and a crankshaft of an engine and operating the engine with the crankshaft floating lip seal assembly. The method includes removing and re-machining a floating seal sleeve coupled to the crankshaft or the flywheel housing, replacing a lip, then re-installing the crankshaft floating lip seal assembly between the flywheel housing and the crankshaft and operating the engine with the re-installed crankshaft floating lip seal assembly.

In one embodiment, a system includes a crankshaft; a flywheel housing; and a multi-position crankshaft lip seal installed between the flywheel housing and the crankshaft. A lip of the multi-position crankshaft lip seal is in sealing engagement with the crankshaft. A drain groove within the multi-position crankshaft lip seal is aligned with a drain passage within the flywheel housing.

DETAILED DESCRIPTION

The following description relates to embodiments of a multi-position crankshaft lip seal that may be re-used after a first overhaul life. The multi-position crankshaft lip seal may be positioned within an engine to close the gap between the crankshaft and the flywheel housing (e.g., the multi-position crankshaft lip seal is positioned between the flywheel housing and crankshaft). Further, the multi-position crankshaft lip seal may drain away any lubricant (e.g., oil) that may seep or leak past the crankshaft lip. The multi-position crankshaft lip seal may include a floating lip seal sleeve with a drain feature and a lip. After a first overhaul life or use threshold has been met (e.g., after the multi-position crankshaft lip seal, crankshaft, and/or flywheel housing have been worn or degraded by a determined degree or a leak has been detected), the floating lip seal sleeve may be re-machined to a determined point and the lip replaced thereby allowing the multi-position crankshaft lip seal to be re-installed at a virgin position on the crankshaft for a second life. Alternatively, fixed crankshaft lip seals demand a tight positioning tolerance where the seal is installed for successful functioning (e.g., sealing) over the lifetime of the seal which is difficult to maintain and costly to achieve (e.g., by re-machining or replacing the crankshaft or flywheel housing). Thus, as compared to conventional methods, initial degradation of the seal does not demand the crankshaft or flywheel housing be re-machined. This may avoid removal, extending the life of the crankshaft. As a technical effect, a multi-position crankshaft lip seal as described herein may reduce costs, labor, time, and the environmental impact otherwise associated with crankshaft lip seal replacement.

Figure 1:
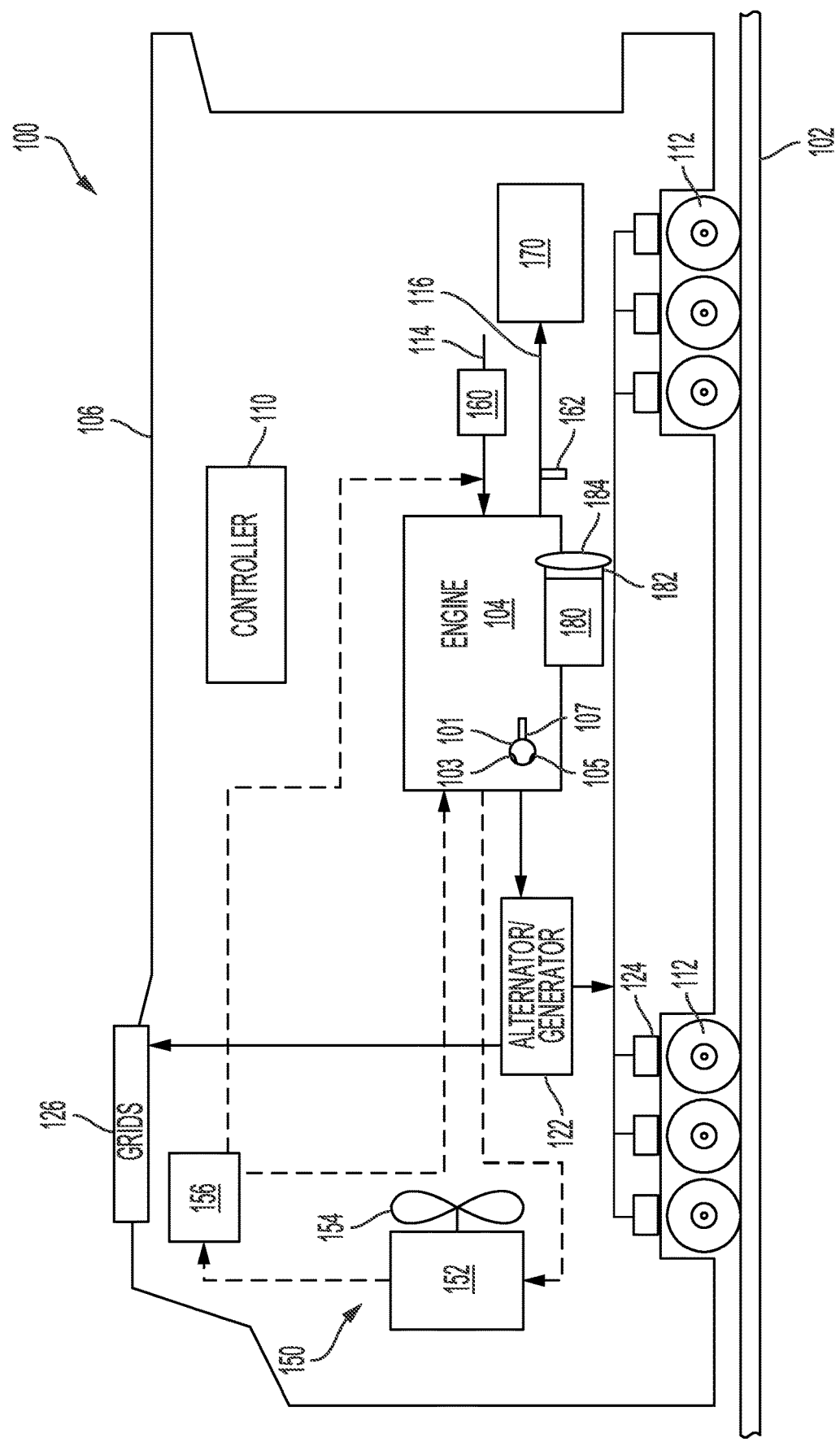
FIG. 1 shows a schematic diagram of a vehicle with an engine having a crankshaft assembly that may include a multi-position crankshaft lip seal of the disclosure.
Figure 2B:
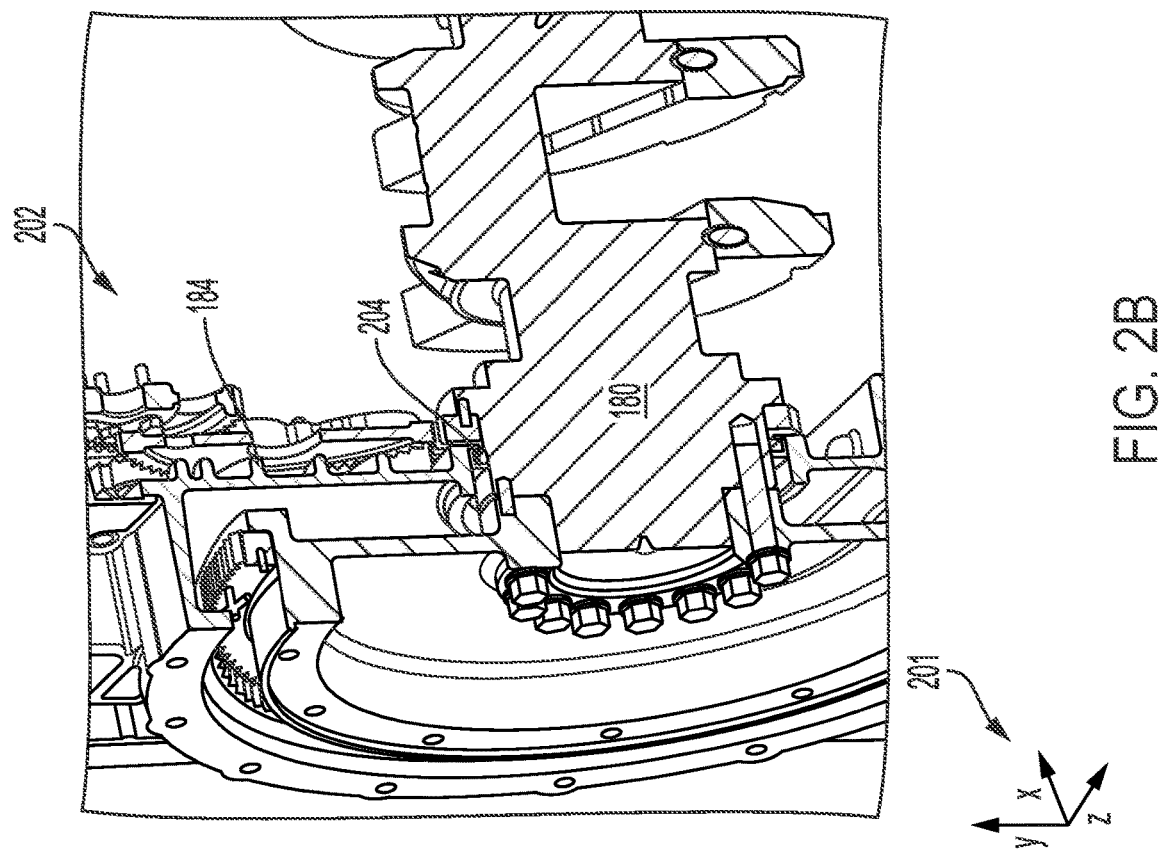
FIGS. 2A and 2B show cross-sectional views of the multi-position crankshaft lip seal positioned between a flywheel housing and a crankshaft.
Figure 2A:
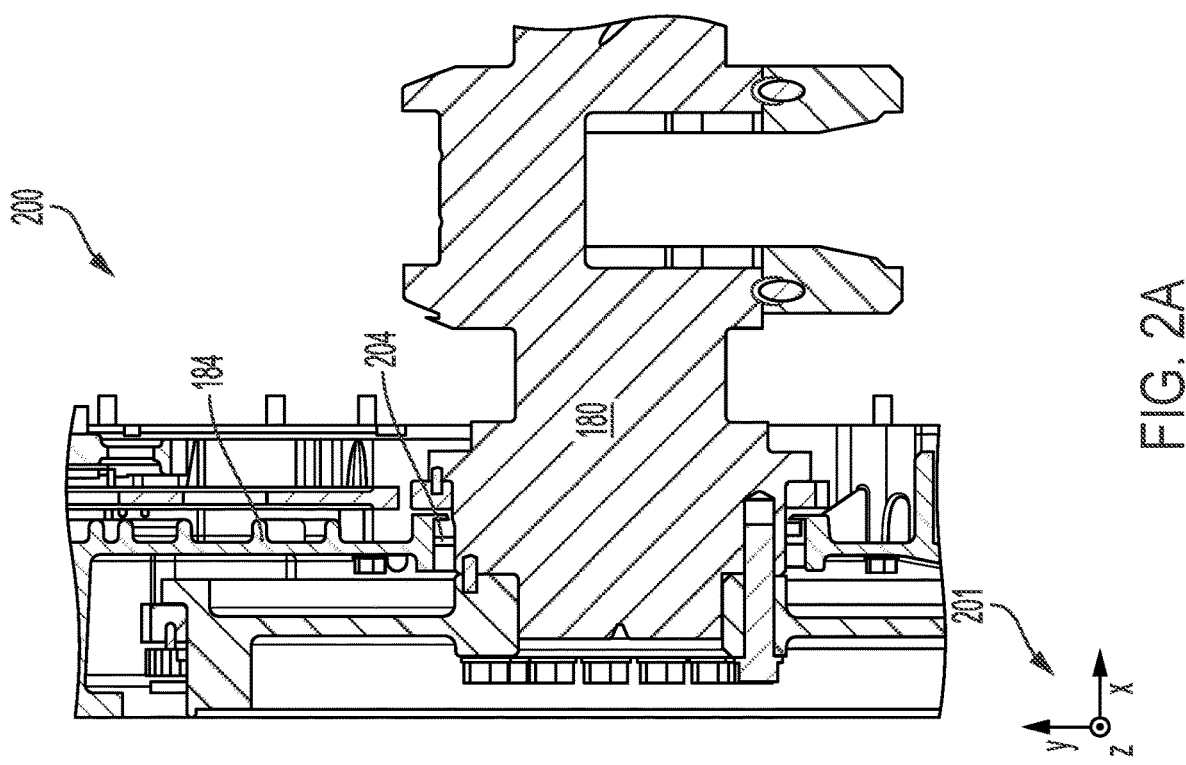
Figure 3:
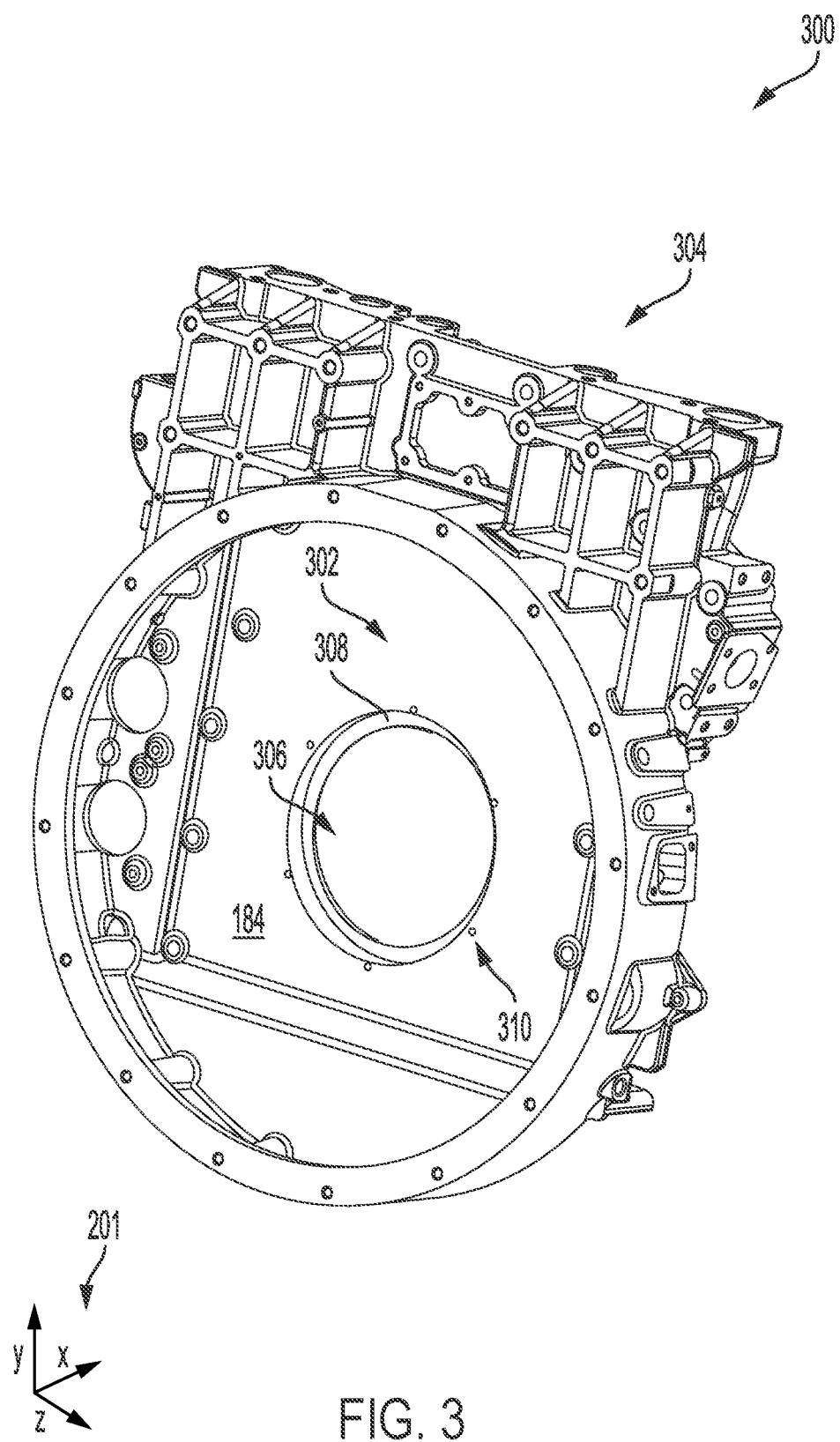
FIG. 3 shows a perspective view of the flywheel housing.
Figure 4A:
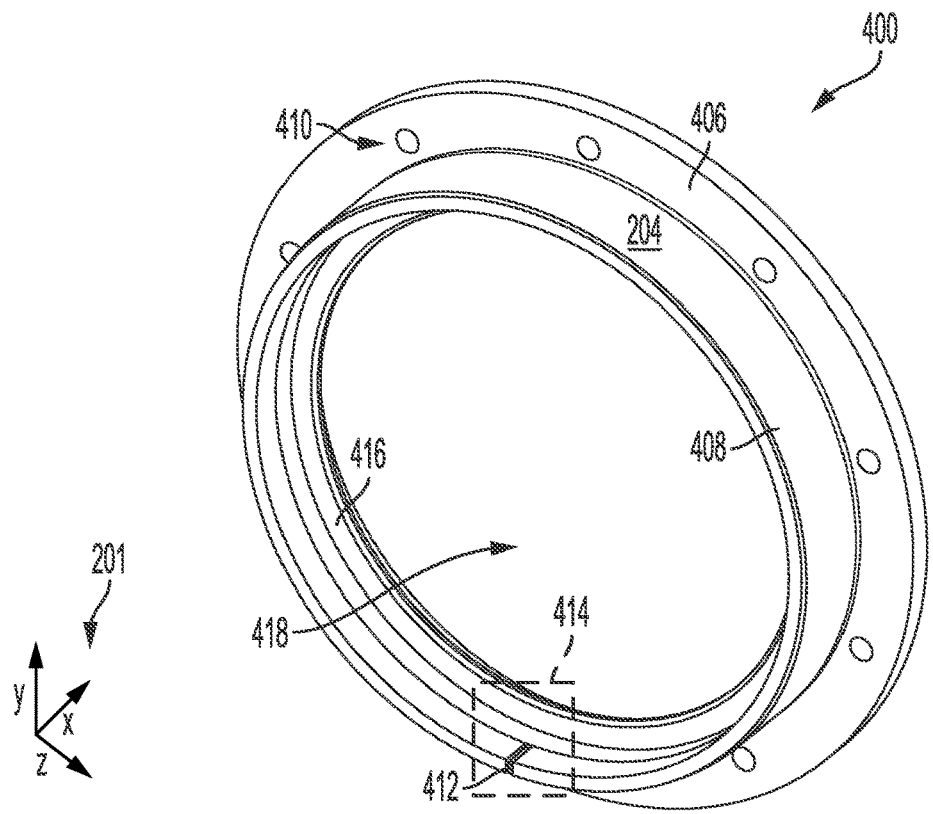
FIGS. 4A-4C shows different views of the multi-position crankshaft lip seal, according to an embodiment of the disclosure.
Figure 4B:
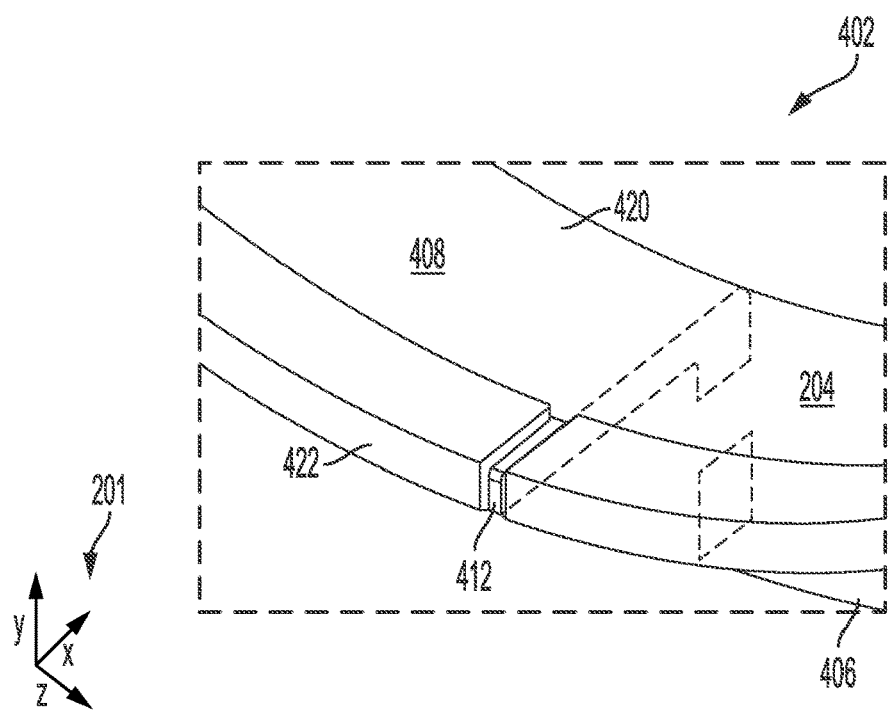
Figure 4C:
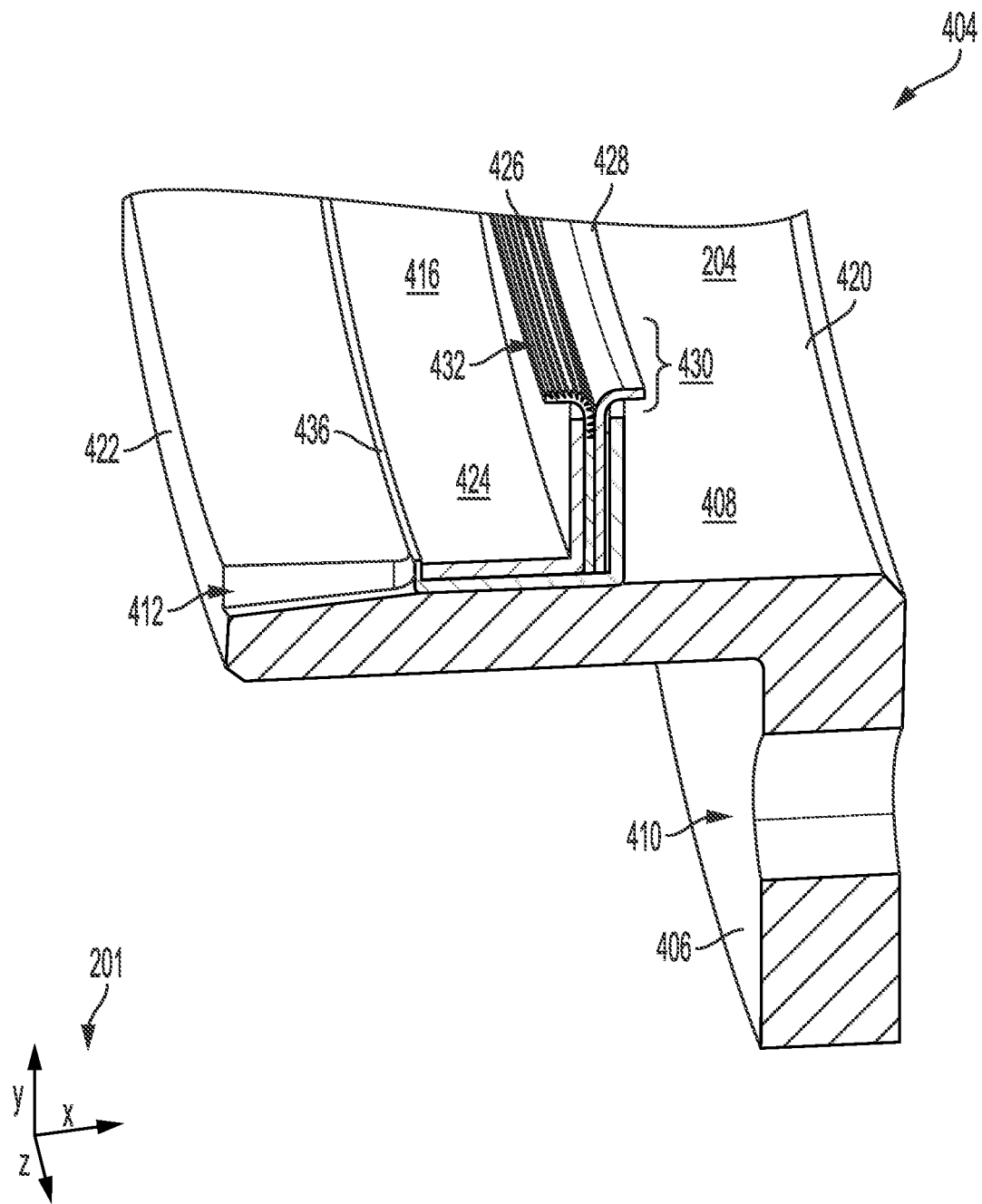
Figure 5A:
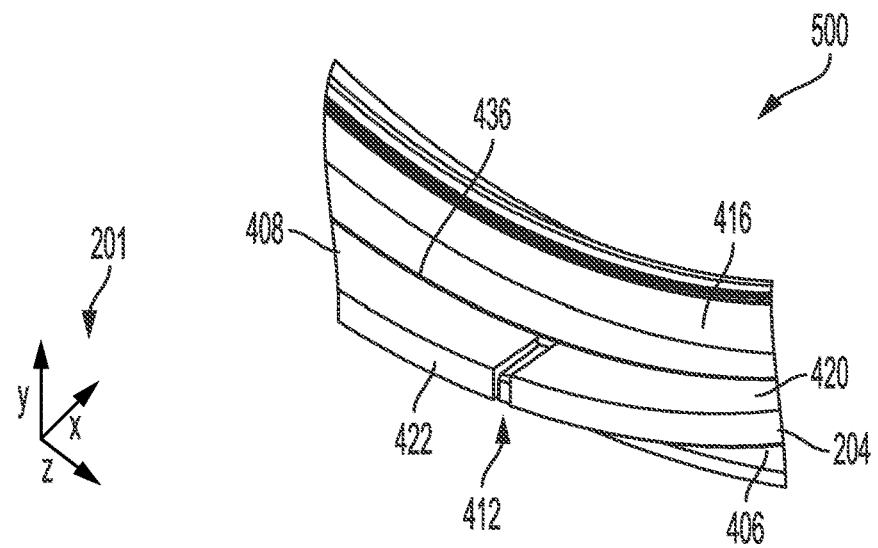
FIGS. 5A and 5B show the position of a drain groove within the multi-position crankshaft lip seal at the start of a first life and a second life, respectively.
Figure 5B:
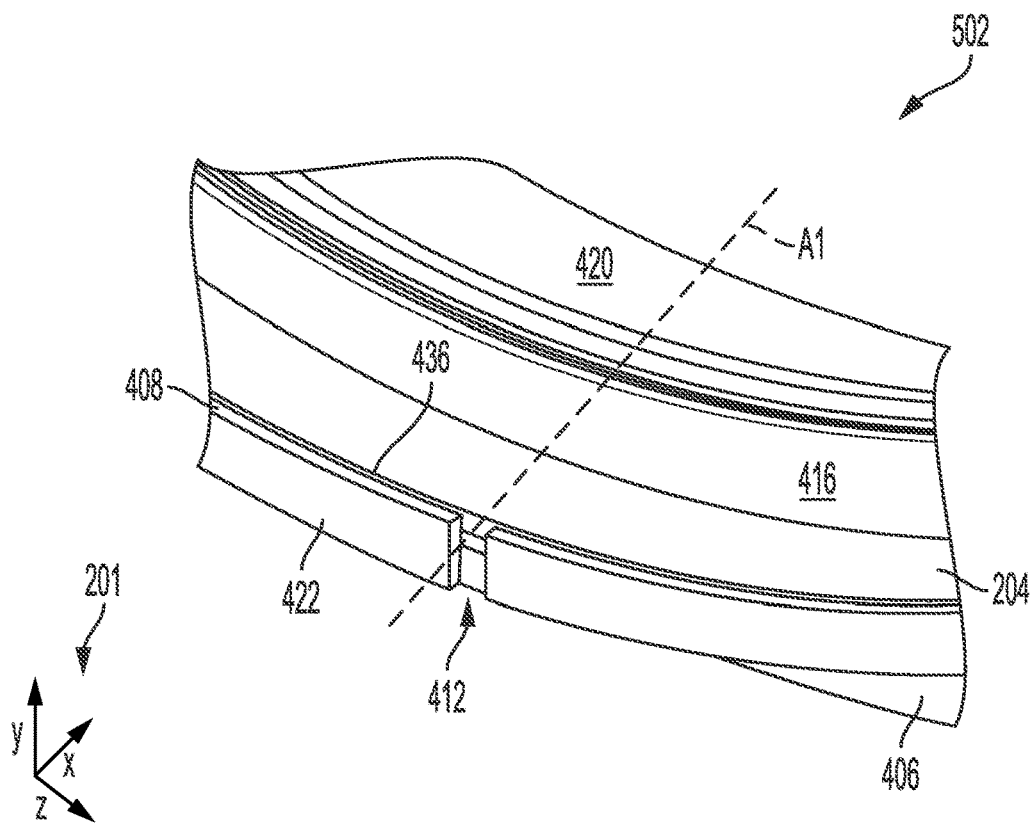
Figure 5C:
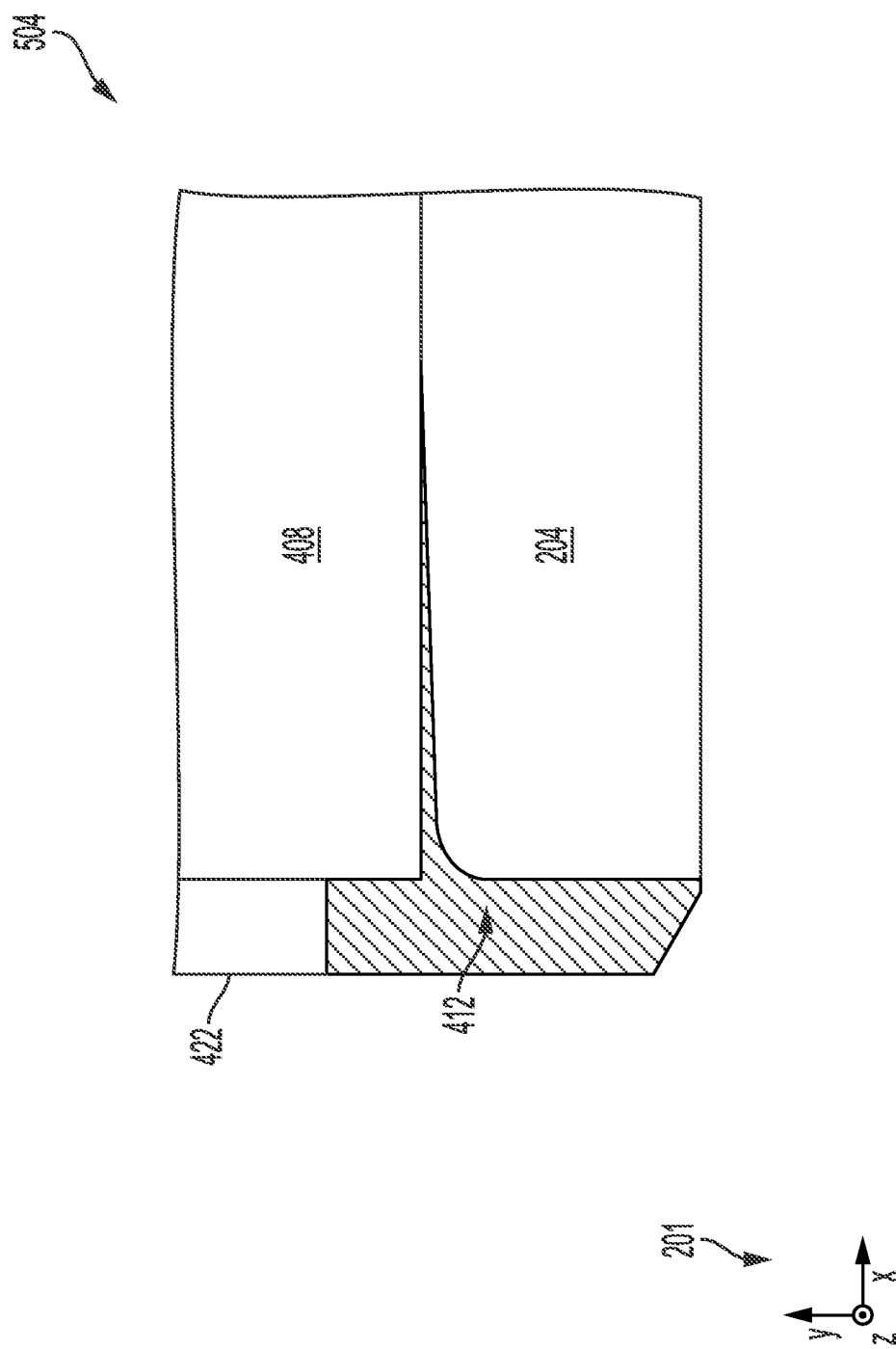
FIG. 5C shows a cross-sectional view of the drain groove of FIG. 5B.
Figure 6:
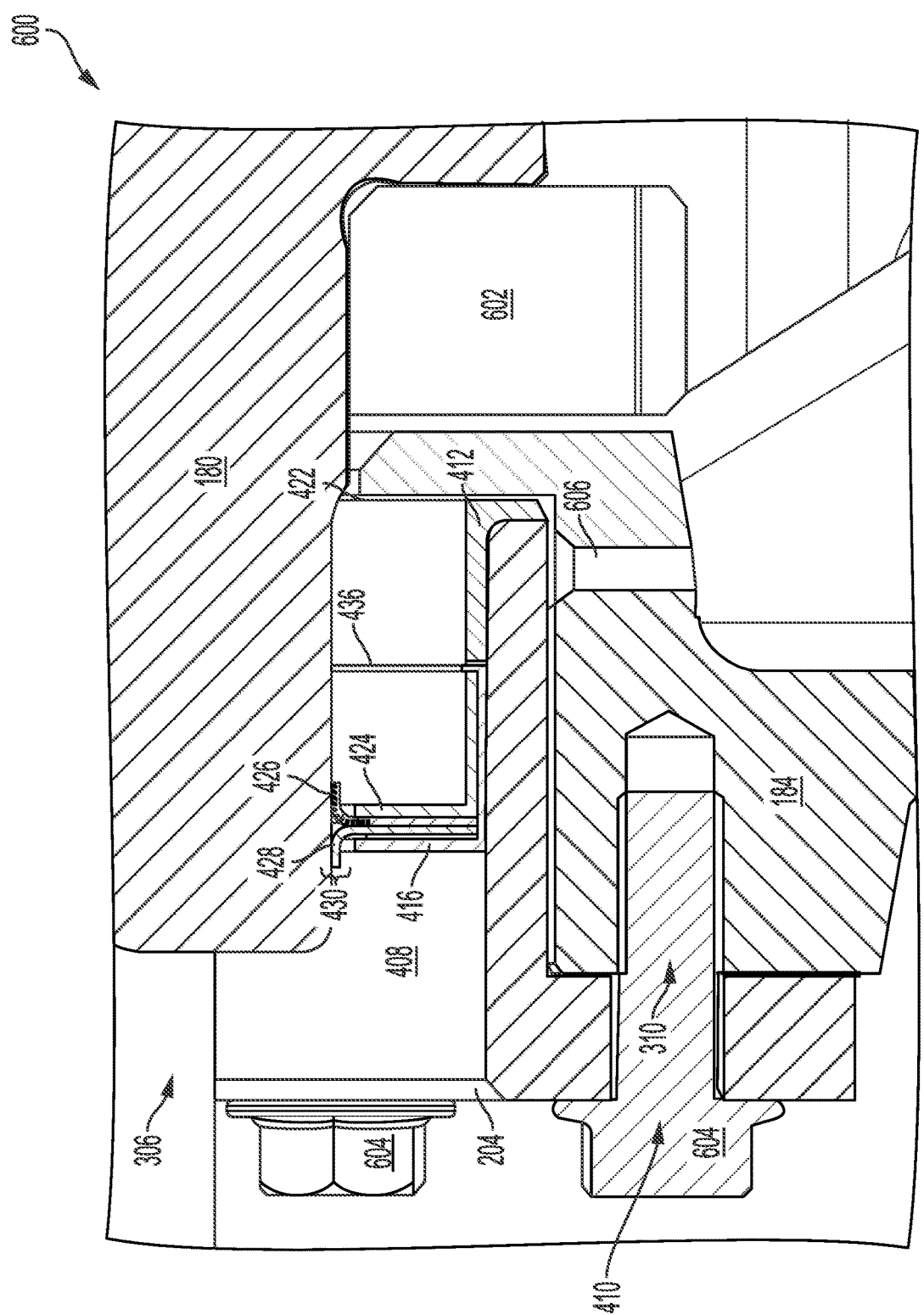
FIG. 6 shows a cross-sectional view of the flywheel housing connected to the multi-position crankshaft lip seal and crankshaft at the start of the first life of the multi-position crankshaft lip seal.
Figure 7:
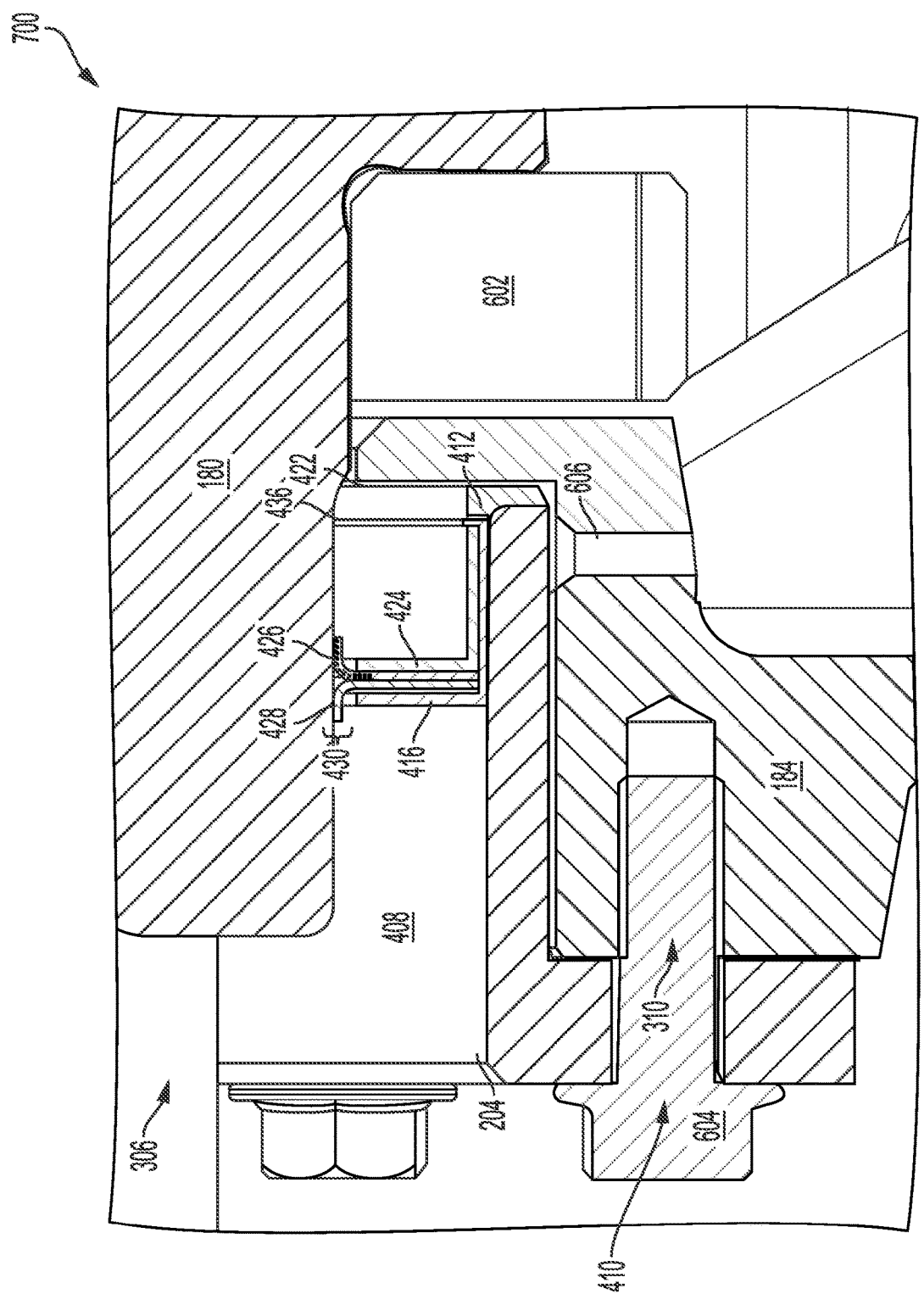
FIG. 7 shows a cross-sectional view of the flywheel housing connected to the multi-position crankshaft lip seal and crankshaft at the start of the second life of the multi-position crankshaft lip seal.
Figure 8:
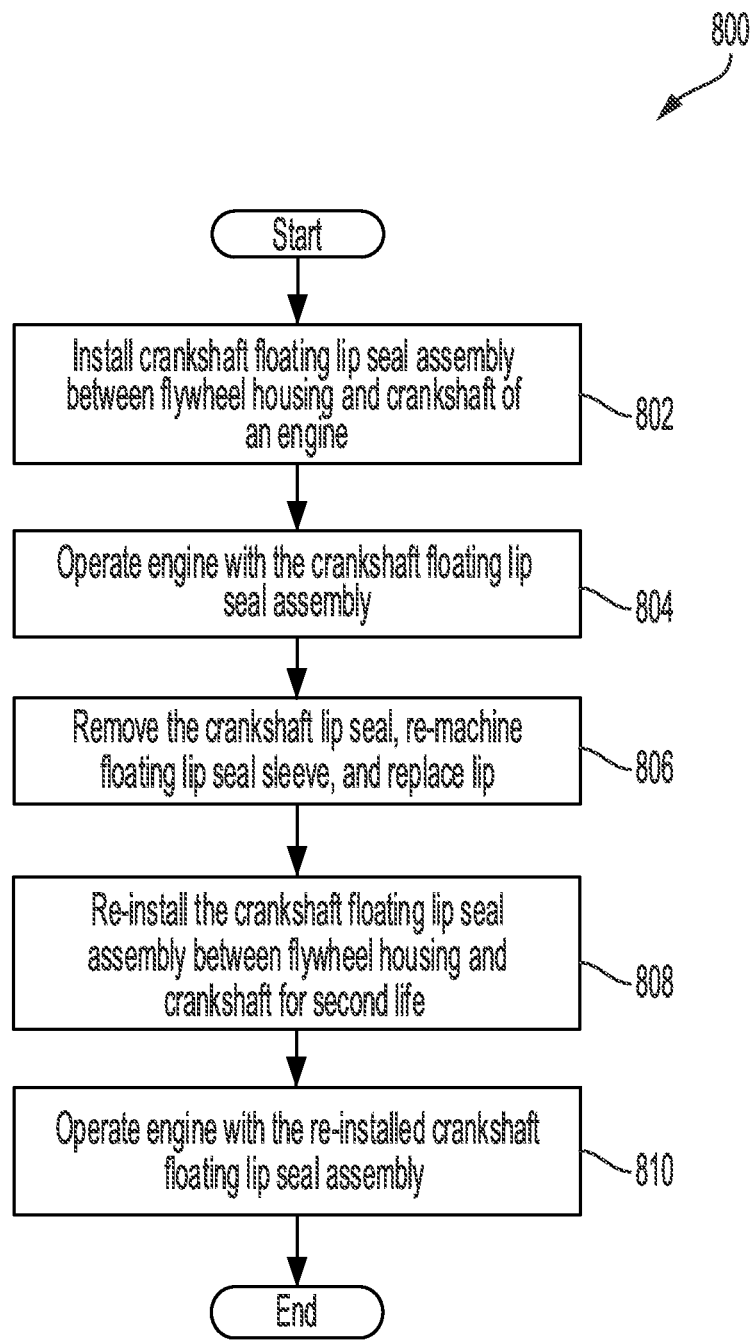
FIG. 8 shows a flowchart illustrating an example method for utilizing a multi-position crankshaft floating lip seal assembly within an engine over the course of the first and second overhaul life according to an embodiment of the disclosure.

FIG. 1 shows an example of a vehicle system that may include a multi-position crankshaft lip seal as described herein. FIGS. 2A and 2B illustrate the installed position of the multi-position crankshaft lip seal relative a flywheel housing and a crankshaft. FIG. 3 shows an example of how the flywheel housing may be machined to introduce a surface that accommodates the floating seal sleeve of the multi-position crankshaft lip seal. FIGS. 4A-4C show different views of the multi-position crankshaft lip seal, according to a non-limiting embodiment. FIGS. 5A-5C show the relative position of the drain feature at the start of the first life and second life of the multi-position crankshaft lip seal. FIGS. 6 and 7 show the position of the multi-position crankshaft lip seal at the start of the first life and second life, respectively, relative to the flywheel housing and crankshaft. FIG. 8 shows a flowchart illustrating an example method for utilizing the multi-position crankshaft lip seal within an engine over the course of the first and second overhaul life according to an embodiment of the present disclosure.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles (e.g., automobiles), mining equipment, marine vessels, rail vehicles, and other off-highway vehicles (OHV). For clarity of illustration, a rail vehicle such as a locomotive may be provided as an example of a mobile platform supporting a system incorporating an embodiment of the disclosure.

FIG. 1 shows an embodiment of a system in which a multi-position crankshaft lip seal may be installed. Specifically, FIG. 1 shows a block diagram of an embodiment of a vehicle system 100, herein depicted as a locomotive 106 configured to run on a road 102 via a plurality of wheels 112. As depicted, the locomotive 106 includes an engine 104. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 includes an air filter 160 that filters air from outside of the locomotive. Exhaust gas resulting from combustion in the engine is supplied to an exhaust passage 116. For example, exhaust passage 116 may include an exhaust gas sensor 162, which may monitor a temperature and/or an air-fuel ratio of the exhaust gas. Exhaust gas flows through the exhaust passage 116 and an exhaust system of the locomotive. For example, exhaust passage 116 may be coupled to a combined spark arrestor and muffler assembly 170 in order to decrease sparks and/or carbon deposits in the exhaust and to reduce unwanted exhaust noise.

The vehicle system may further include an aftertreatment system coupled in the exhaust passage 116. In one embodiment, the aftertreatment system may include one or more emission control devices. Such emission control devices may include a selective catalytic reduction (SCR) catalyst, a three-way catalyst, a $NO_x$ trap, or various other devices or exhaust aftertreatment systems. In another embodiment, the aftertreatment system may additionally or alternatively include a diesel oxidation catalyst (DOC) and a diesel particulate filter (DPF).

Further, combustion in the cylinder(s) drives rotation of a crankshaft 180. The crankshaft 180 may be coupled to a flywheel housing 184, with a seal 182 positioned between the flywheel housing 184 and the crankshaft 180. In some examples, the seal 182 may be a multi-position crankshaft lip seal according to the present disclosure, as further described with respect to FIGS. 2A-7. The crankshaft 180 may be in splined engagement with a flywheel (not shown) within the flywheel housing 184, the flywheel additionally engaged by a pinion of the starter to turn the crankshaft 180 and start the engine 104.

In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, biodiesel, or other petroleum distillates of similar density through compression ignition (and/or spark ignition).

As depicted in FIG. 1, the engine is coupled to an electric power generation system that includes an alternator/generator 122. For example, the engine is a diesel and/or natural gas engine that generates a torque output that is transmitted to the alternator/generator 122, which is mechanically coupled to the crankshaft, as well as to at least one of the plurality of wheels 112 to provide motive power to propel the locomotive. The alternator/generator 122 produces electrical power that may be stored and applied for subsequent propagation to a variety of downstream electrical components. In one example, the alternator/generator 122 may be coupled to an electrical system 126. The electrical system 126 may include one or more electrical loads configured to run on electricity generated by the alternator/generator 122, such as vehicle headlights, a cabin ventilation system, and an entertainment system, and may further include an energy storage device (e.g., a battery) configured to be charged by electricity generated by the alternator/generator 122. In some examples, the vehicle may be a diesel electric vehicle, and the alternator/generator 122 may provide electricity to one or more electric motors to drive the wheels 112.

As depicted in FIG. 1, the vehicle system further includes a cooling system 150 (e.g., an engine cooling system). The cooling system 150 circulates coolant through the engine 104 to absorb waste engine heat and distribute the heated coolant to a heat exchanger, such as a radiator 152 (e.g., a radiator heat exchanger). In one example, the coolant may be water. A fan 154 may be coupled to the radiator 152 in order to maintain an airflow through the radiator 152 when the vehicle is moving slowly or stopped while the engine 104 is running. In some examples, fan speed may be controlled by the controller 110. Coolant that is cooled by the radiator 152 may enter a tank (not shown). The coolant may then be pumped by a water, or coolant, pump 156 back to the engine or to another component of the vehicle system.

The controller 110 may be configured to control various components related to the locomotive vehicle system. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of locomotive operation. In some examples, the controller 110 may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller 110 may control the engine and/or the vehicle by sending commands to various components such as the one or more electric motors 124, the alternator/generator 122, fuel injectors 107, valves, coolant pump 156, or the like. For example, the controller 110 may control the operation of a restrictive element (e.g., such as a valve) in the engine cooling system. Other actuators may be coupled to various locations in the vehicle.

FIGS. 2A-7 provide embodiments of a multi-position crankshaft lip seal 204 that may be included in a vehicle system, such as the vehicle system 100 of FIG. 1. For example, seal 204 may be one embodiment of the seal 182 of vehicle system 100 shown in FIG. 1. FIGS. 2A-7 will be described collectively, with like components numbered the same and not reintroduced between figures. FIGS. 2A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 201 are included in each FIGS. 2A-7 in order to compare the views and relative orientations described below. FIGS. 2A-7 are drawn approximately to scale, although other dimensions or relative dimensions may be used.

Turning now to FIGS. 2A and 2B, a cross-sectional side view 200 and cross-sectional perspective view 202, respectively, of the connection between the flywheel housing 184, the multi-position crankshaft lip seal 204, and the crankshaft 180 is illustrated. The multi-position crankshaft lip seal 204 may be in face-sharing contact with the flywheel housing 184 and the crankshaft 180 thereby creating a seal and providing a friction barrier between the two components. As the flywheel housing 184 remains in a fixed position during engine use, the crankshaft 180 will rotate as demanded. As such, the portion of the multi-position crankshaft lip seal 204 in contact with the crankshaft 180 will be worn down by crankshaft rotation over time. Once a wear threshold or limit has been met, the worn portions of the multi-position crankshaft lip seal 204 may be machined off and replaced so that the multi-position crankshaft lip seal 204 re-installed (e.g., at a virgin position on the crankshaft) for a second life as further shown and described below.

FIG. 3 shows a perspective view 300 of a non-limiting example of how the flywheel housing 184 may be machined in order to introduce the multi-position crankshaft lip seal 204 so that a floating seal sleeve 408 (as shown in at least FIG. 4A) including the seal 204 may be inserted through a central aperture 306 in the housing 184. As shown in a perspective view 400 of FIG. 4A, the multi-position crankshaft lip seal 204 has a washer-shaped flange section 406 that extends perpendicularly away from the floating seal sleeve 408 and a ring-shaped sealing lip 416 that surrounds the inner circumference of the floating seal sleeve 408 (e.g., the lip 416 lines a central aperture 418 of the floating seal sleeve 408). The lip 416 may be formed from a suitable material(s) and may have dimensions such that when the multi-position crankshaft lip seal 204 is connected to the flywheel housing 184, the crankshaft 180 may be inserted through the central aperture 418 of the floating seal sleeve 408 and a seal is formed around the inserted portion of the crankshaft 180 via the lip 416. The lip 416 is shown in more detail with respect to FIG. 4C, as described below. The multi-position crankshaft lip seal 204 also has a drain groove 412 located within the floating seal sleeve 408 that extends partially through the sleeve, away from the lip 416 and the flange section 406.

An enlarged view 402 of the area indicated by box 414 that includes the drain groove 412 is shown in FIG. 4B. The lip 416 has been removed from the enlarged view 402 to show the drain groove 412 in more detail. The drain groove 412 may be L-shaped, extending partially across and into an inner surface 420 then down across and into a bottom edge 422 of the floating seal sleeve 408. The drain groove 412 may be of suitable dimensions so that when the multi-position crankshaft lip seal 204 is positioned between the flywheel housing 184 and the crankshaft 180, the drain groove 412 may connect to a drain passage 606 within the flywheel housing 184, as further shown and described with respect to FIGS. 6 and 7. In this way, any lubricant (e.g., oil) that may seep or leak past the crankshaft lip may be drained away via the drain groove 412. In some examples, the drain groove 412 may extend across the full width (e.g., along the y-axis) of the bottom edge 422 and into a third of the full width (e.g., along the x-axis) of the inner surface 420. For example, the inner surface 420 of the floating seal sleeve 408 may have a width of 48 mm (e.g., along the x-axis). The drain groove 412 may have a 4 mm width (e.g., along the z-axis), 2 mm depth, and 16 mm length (e.g., along the x-axis) within the inner surface 420, the groove 412 extending down across the full width (e.g., along the y-axis) of the bottom edge 422.

The flange section 406 is traversed by a plurality of openings 410. The plurality of openings 410 may be complimentary in position and dimensions to a plurality of bores 310 (as shown in FIG. 3) surrounding the central aperture 306 of the flywheel housing 184 so that the multi-position crankshaft lip seal 204 may be connected to the flywheel housing 184 via aligning the openings 410 with the bores 310 and inserting a suitable fastener or fastening system (e.g., a nut and bolt) therethrough. Thus, returning to FIG. 3, the floating seal sleeve 408 of the multi-position crankshaft lip seal 204 may be inserted into the central aperture 306 of the flywheel housing 184 so that the bottom edge 422 extends toward a first side 304 of the flywheel housing 184 and the flange section 406 is in face-sharing contact with a second side 302 of the flywheel housing 184. When the flywheel housing 184 is installed within the engine, the first side 304 faces the crankshaft 180 and the second side 302 is connected to a flywheel. After insertion, the plurality of openings 410 within the flange section 406 may be aligned to/with the plurality of bores 310 surrounding the central aperture 306 and the multi-position crankshaft lip seal 204 connected to the flywheel housing 184 via the aligned openings/bores using a suitable fastening mechanism.

Turning now to FIG. 4C, a cross-sectional view 404 of the multi-position crankshaft lip seal 204 taken across the drain groove 412 is illustrated. The lip 416 of the seal 204 may have a double L-shaped bracket 424 that partially houses a first insert 426 and a second insert 428. The portions of the first and second inserts 426, 428 that extend beyond the bracket 424 may include a sealing element 430 that engages with the crankshaft 180 to form a seal. The first and second inserts 426, 428 may be formed from suitable materials to form a seal around the crankshaft. Suitable materials may include compounded synthetic rubber, polyethylene, polypropylene, fluorocarbon polymers, and the like. The sealing element 430 of the first and second inserts 426, 428 may be bent or otherwise shaped to increase engagement with the crankshaft 180. For example, the first insert 426 may be curved away from the second insert 426 and vice versa. Additionally, the portion of the first insert 426 including the sealing element 430 may be lined with a series of ridges 432 to increase engagement with the crankshaft 180.

As shown in the view 404, the drain groove 412 may angle upward from the bottom edge 422 and terminate at the boundary of the lip 416 nearest the bottom edge 422. In other words, the drain groove 412 may slope away/recede at a downward angle from the lip 416, for increased drainage, extending only between the bottom edge 422 and the lip 416 (e.g., not across the entire inner surface 420 of the floating seal sleeve 408). During the life of the multi-position crankshaft lip seal 204, the bottom edge 422 and the lip 416 are in face-sharing contact with crankshaft 180 and, as such, all surfaces in contact may be ground/worn down by crankshaft rotation. Thus, over time and use, the efficacy of the seal formed between the crankshaft 180 and the multi-position crankshaft lip seal 204 may be reduced with time and use. However, once a first overhaul life or use threshold has been met, the multi-position crankshaft lip seal 204 may be removed, the floating seal sleeve 408 re-machined, the lip 416 replaced, and the multi-position crankshaft lip seal 204 re-installed for a second life so that the new lip is positioned on a virgin surface of the crankshaft 180.

FIG. 5A shows a perspective view 500 of the position of the bottom edge 422 relative to the front edge 436 of the lip 416 at the start of the first life of the multi-position crankshaft lip seal 204. FIG. 5B shows a perspective view 502 of the position of the bottom edge 422 relative to the front edge 436 of the lip 416 at the start of the second life of the multi-position crankshaft lip seal 204 (e.g., after the multi-position crankshaft lip seal 204 has been removed, the floating seal sleeve 408 re-machined, and the lip 416 replaced after the end of a first overhaul life). As shown in view 502, after the first overhaul life or a use threshold has been met, the floating seal sleeve 408 may be re-machined so that the bottom edge 422 is shifted inward toward the front edge 436 of the lip 416 without altering the dimensions of the portion of the drain groove 412 extending across the bottom edge 422. In this way, the draining function of the multi-position crankshaft lip seal 204 may be maintained and an effective seal may again be formed around the crankshaft 180 once the re-machined multi-position crankshaft lip seal 204 is re-installed, as further shown and described with respect to FIGS. 6 and 7. FIG. 5C shows an enlarged cross-sectional view 504 of FIG. 5B taken across axis A1 illustrating the new dimensions of the drain groove 412 (as compared to that during the first life as shown in FIG. 4C) for the second life of the multi-position crankshaft lip seal 204. For example, the length (e.g., along the x-axis) of the drain groove 412 within the inner surface 420 may be 16 mm at the start of the first life and 2.5 mm at the start of the second life (e.g., after the seal 204 is removed and re-machined).

FIG. 6 is a cross-sectional view 600 of the flywheel housing 184 connected to the multi-position crankshaft lip seal 204 and crankshaft 180 at the start of the first life of the multi-position crankshaft lip seal 204. As shown in the view 600, the multi-position crankshaft lip seal 204 may be positioned between the crankshaft 180 and the flywheel housing 184, with the bottom edge 422 facing a gear 602 of the crankshaft 602. As previously described, the multi-position crankshaft lip seal 204 may be inserted through the central aperture 306 of the flywheel housing 184. The seal 204 may be subsequently connected to the flywheel housing 184 by inserting suitable fastening mechanisms, such as threadingly engaged bolts 604, through the plurality of openings 410 of the seal 204 and into the aligned plurality of bores 310 of the flywheel housing 184. In this way, the sealing element 430 of the lip 416 of the multi-position crankshaft lip seal 204 may engage with the crankshaft 180 and the drain groove 412 may connect with a drain passage 606 within the flywheel housing 184. Thus, a seal may be formed between the crankshaft 180 and the multi-position crankshaft lip seal 204 via the lip 416, with any lubricant that seeps past the sealed connection drained away by passing through the drain groove 412 into the drain passage 606.

Once a leak is detected, a major engine overhaul is conducted, or a first overhaul life of the multi-position crankshaft lip seal 204 has been reached, the seal 204 may be removed, the floating seal sleeve 408 re-machined, the lip 416 replaced, and the seal 204 re-installed for a second life at a new sealing surface (e.g., a virgin surface that is not worn) of the crankshaft 180. FIG. 7 shows a cross-sectional view 700 of the position of the multi-position crankshaft lip seal 204 between the crankshaft 180 and the flywheel housing 184 as the start of the second life (e.g., after the seal 204 has been removed, the floating seal sleeve 408 re-machined, the lip 416 replaced, and the seal 204 re-installed). As shown in the view 700, the bottom edge 422 of the multi-position crankshaft lip seal 204 is closer to the lip 416 at the start of the second life as compared to the position of the bottom edge 422 at the start of the first life, as shown in view 600 of FIG. 6. As previously described, the drain groove 412 is shortened (e.g., length reduced along the x-axis) after re-machining the floating seal sleeve 408 but may still connect with the drain passage 606 within the flywheel housing 184 after being re-installed, as shown in FIG. 7. Further, the sealing element 430 of the new lip 416 may still engage with the crankshaft 180, just at a shifted position (e.g., axially along the length of the crankshaft 180) relative to that of the first life of the of the multi-position crankshaft lip seal 204, as illustrated by a comparison between FIGS. 6 and 7. Thus, the position of lip engagement is shifted to a virgin surface of the crankshaft 180 so that the re-installed multi-position crankshaft lip seal 204 may prevent oil and/or crankcase gas from exiting the engine. Thus, the function of the multi-position crankshaft lip seal 204 may be maintained for a second life by re-machining the floating seal sleeve 408, replacing the lip 416, and re-installing the seal 204 at a new position on the crankshaft 180.

In this way, the components of FIGS. 1-7 enable the system for a multi-position crankshaft lip seal comprising: a floating seal sleeve comprising a drain groove, a lip, and sacrificial material, and a flange section extending perpendicularly from the floating seal sleeve, where the sacrificial material is positioned opposite the flange section and extends away from the lip, the sacrificial material later machined off without altering the lip or function of the drain groove.

FIG. 8 shows a flowchart illustrating a method 800 for utilizing a crankshaft floating lip seal assembly, such as multi-position crankshaft lip seal 204, within an engine over the course of a first and second overhaul life, according to an embodiment of the present disclosure. Method 800 may be executed in a vehicle system, such as vehicle system 100 of FIG. 1. In some examples, method 800 may be executed in an another suitable system without departing from the scope of this disclosure.

At 802, method 800 may include installing the crankshaft floating lip seal assembly between a flywheel housing and crankshaft (e.g., flywheel housing 184 and crankshaft 180) of an engine. The crankshaft floating lip seal assembly (e.g., multi-position crankshaft lip seal 204) may have a flange section (e.g., flange section 406) that extends perpendicularly away from a floating lip sleeve (e.g., floating seal sleeve 408). The inner surface of the floating lip sleeve may be lined with a lip (e.g., lip 416) and include a drain groove (e.g., drain groove 412) that extends from the lip through a bottom edge (e.g., located opposite the flange section) of the floating lip sleeve. During installation, the floating lip sleeve may be inserted through a central aperture (e.g., central aperture 306) within the flywheel housing so that the flange section is in face-sharing contact with the surface of the flywheel housing surrounding the central aperture and the drain groove/bottom edge of the floating lip sleeve is facing a crank gear (e.g., gear 602) coupled to the crankshaft. The crankshaft floating lip seal assembly may be coupled to the flywheel housing via the flange section using a suitable connection technique/mechanism wherein the crankshaft floating lip seal assembly may be removed and re-installed. For example, a plurality of openings (e.g., plurality of openings 410) within the flange section may be aligned with a complimentary set of bores (e.g., plurality of bores 310) surrounding the central aperture of the flywheel housing and a bolt (e.g., bolt 604) inserted that may be threadingly engaged with the aligned openings and bores.

The crankshaft floating lip seal assembly may be positioned so that the drain groove within the floating lip connects with a drain passage within the flywheel housing. Moreover, a sealing element (e.g., sealing element 430) of the lip may engage with and around a portion of the crankshaft thereby forming a seal between the crankshaft and the crankshaft floating lip seal assembly. In this way, relative movement between the flywheel housing and the crankshaft may be absorbed by the crankshaft floating lip seal assembly. Further, lubricant (e.g., oil) that may seep between the crankshaft and the crankshaft floating lip seal assembly may be drained by passing through the drain groove and into the drain passage of the flywheel housing. At 804, the engine may be operated with the crankshaft floating lip seal assembly.

At 806, the crankshaft floating lip seal assembly may be removed, the floating lip sleeve re-machined, and the lip replaced. After removal by uncoupling the flange section from the flywheel housing (e.g., via unthreading the bolts from the plurality of openings and bores within the crankshaft floating lip seal assembly and flywheel housing, respectively), the floating lip seal may be re-machined to re-position the replacement lip on a new sealing surface on the crankshaft. For example, the crankshaft floating lip seal assembly may be re-machined so the portion of the floating lip sleeve that extends from the lip to the bottom edge is reduced by two-thirds. Thus, re-machining may create a new pristine surface on the bottom edge while the drain groove is maintained so that the crankshaft floating lip seal assembly may be re-installed between the flywheel housing and the crankshaft for a second life without losing any original function.

At 808, the re-machined crankshaft floating lip seal assembly may be re-installed between the flywheel housing and the crankshaft for a second life. The crankshaft floating lip seal assembly may be re-installed in the same manner as initial installation described at step 802, with the relative position of the replacement lip shifted to a virgin surface of the crankshaft (as illustrated in FIG. 7). The shortened drain channel may still connect with the drain passage within the flywheel housing and the lip 416 may still engage with the crankshaft 180, just at a shifted axial position relative to that of the first life, after re-installation of the crankshaft floating lip seal assembly. At 814, the engine may be operated with the re-installed crankshaft floating lip seal assembly.

In this way, the multi-position crankshaft floating lip seal assembly may be positioned to bridge the gap between the flywheel housing and crankshaft within a system, such as a locomotive vehicle system, as well as drain away any lubricant (e.g., oil) that may seep or leak past the crankshaft lip over the course of a first overhaul life and a second overhaul life. After a first overhaul life (e.g., after a leak is detected), the multi-position crankshaft floating lip seal assembly may be removed, the lip replaced, and the floating lip seal sleeve re-machined to a determined point to remove any degradation and/or debris resulting from the first life as well as shift the position the replacement lip so that the lip is positioned on a pristine surface of the crankshaft after re-installation of the multi-position crankshaft floating lip seal assembly. The floating lip seal sleeve may be re-machined so that the sealing and draining function of the multi-position crankshaft floating lip seal assembly remains intact, with the position of the lip simply shifted axially inward along the crankshaft after re-installation. A technical effect of reusing/installing the same multi-position crankshaft floating lip seal assembly after a first overhaul life is that time, costs, and labor that may be associated with crankshaft floating lip seal assembly replacement may be reduced.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, the method comprising:
installing a crankshaft floating lip seal assembly between a flywheel housing of the engine and a crankshaft of the engine, the crankshaft floating lip seal assembly comprising a floating seal sleeve and a lip;
operating the engine with the crankshaft floating lip seal assembly;
removing the crankshaft floating lip seal assembly, re-machining the floating seal sleeve coupled to the crankshaft or the flywheel housing, and replacing the lip;
reinstalling the crankshaft floating lip seal assembly between the flywheel housing and the crankshaft; and
operating the engine with the reinstalled crankshaft floating lip seal assembly.

2. The method of claim 1, wherein installing and reinstalling the crankshaft floating lip seal assembly comprises positioning the lip located within the floating seal sleeve around the crankshaft so that the lip is in sealing engagement with the crankshaft.

3. The method of claim 1, wherein installing the crankshaft floating lip seal assembly comprises fixedly attaching the crankshaft floating lip seal assembly to the flywheel housing.

4. The method of claim 3, wherein the crankshaft floating lip seal assembly includes a flange section extending perpendicularly out of the floating seal sleeve,
wherein the lip surrounds an inner circumference of the floating seal sleeve, and
wherein installing the crankshaft floating lip seal assembly comprises aligning a drain groove within the floating seal sleeve with a drain passage within the flywheel housing.

5. The method of claim 4, wherein re-machining the floating seal sleeve comprises removing a portion of the drain groove by reducing a total length of the floating seal sleeve.

6. The method of claim 4, wherein reinstalling the crankshaft floating lip seal assembly comprises aligning the drain groove with the drain passage and fixedly attaching the crankshaft floating lip seal assembly to the flywheel housing.

7. The method of claim 4, wherein installing and reinstalling the crankshaft floating lip seal assembly comprises inserting the floating seal sleeve through a central aperture within the flywheel housing with the flange section in face-sharing contact with a surface of the flywheel housing surrounding the central aperture and the drain groove of the floating seal sleeve facing a crank gear coupled to the crankshaft.

8. The method of claim 4, wherein the drain groove is L-shaped, the drain groove extending at least partially across and into an inner surface of the floating seal sleeve, and down across and into a bottom edge of the floating seal sleeve, and
wherein the drain groove slopes at a downward angle from the lip while extending between the bottom edge of the floating seal sleeve and the lip.

9. The method of claim 1, wherein the lip includes a double L-shaped bracket partially housing each of a first insert and a second insert, portions of the first and second inserts extending beyond the double L-shaped bracket forming a sealing element engaging with the crankshaft to form a sealing engagement with the crankshaft, and
wherein the sealing element is bent with the first insert being curved away from the second insert, the first insert including a series of ridges.

10. The method of claim 1, wherein reinstalling the crankshaft floating lip seal assembly is in response to a first overhaul life of the crankshaft floating lip seal assembly being reached or upon degradation of the crankshaft floating lip seal assembly, the crankshaft floating lip seal assembly being reinstalled for a second overhaul life.

11. A system, comprising: a crankshaft; a flywheel housing;
and a multi-position crankshaft lip seal installed between the flywheel housing and the crankshaft, wherein a lip of the multi-position crankshaft lip seal is in sealing engagement with the crankshaft, a drain groove within the multi-position crankshaft lip seal is aligned with a drain passage within the flywheel housing, wherein after a first life has been met, the multi-position crankshaft lip seal is uninstalled, re-machined, the lip replaced with another lip, and reinstalled for a second life, and wherein the re-machining includes re-machining a floating seal sleeve coupled to the crankshaft or the flywheel housing to shift a bottom edge of the floating seal sleeve towards a front edge of the lip, the lip lining a central aperture of the floating seal sleeve.

12. The system of claim 11, wherein the re-machining reduces a portion of the floating seal sleeve extending from the lip to the bottom edge by two-thirds.

13. The system of claim 11, wherein the multi-position crankshaft lip seal is inserted through an aperture in the flywheel housing.

14. The system of claim 11, wherein the lip includes one or more bent inserts engaging with the crankshaft to form a sealing engagement with the crankshaft.

15. A system for a multi-position crankshaft lip seal, the system comprising: a floating seal sleeve comprising a drain groove, a lip, and a sacrificial material; and a flange section extending perpendicularly from the floating seal sleeve, where the sacrificial material is positioned opposite the flange section and extends away from the lip, the sacrificial material later machined off without altering the lip or a function of the drain groove, wherein the multi-position crankshaft lip seal is positioned between a flywheel housing and a crankshaft of an engine, and wherein the drain groove is aligned with a drain passage within a flywheel housing and lubricant seeping between a crankshaft and the multi-position crankshaft lip seal is drained through the drain groove into the drain passage.

16. The system of claim 15, wherein machining off the sacrificial material is in response to a use threshold of the multi-position crankshaft lip seal being reached or upon degradation of the multi-position crankshaft lip seal.

\* \* \* \* \*